United States Patent [19]

Uehara et al.

[11] 4,285,727

[45] Aug. 25, 1981

[54] INK COMPOSITIONS FOR INK JET RECODING

[75] Inventors: Masafumi Uehara; Mitsuyoshi Itano, both of Hino, Japan

[73] Assignee: Konishiroku Photo Industry Co., Ltd., Tokyo, Japan

[21] Appl. No.: 103,609

[22] Filed: Dec. 14, 1979

[30] Foreign Application Priority Data

Dec. 18, 1978 [JP] Japan ................................ 53-158074

[51] Int. Cl.$^3$ ............................................. C09D 11/00
[52] U.S. Cl. ...................................................... 106/22
[58] Field of Search ......................................... 106/22

[56] References Cited

U.S. PATENT DOCUMENTS

| | | | |
|---|---|---|---|
| 3,705,043 | 12/1972 | Zabiak | 106/20 |
| 3,846,141 | 11/1974 | Ostergren | 106/22 |
| 3,946,398 | 3/1976 | Kyser et al. | 346/1 |
| 4,150,997 | 4/1979 | Hayes | 106/22 |

*Primary Examiner*—Lorenzo B. Hayes
*Assistant Examiner*—Amelia Burgess Yarbrough
*Attorney, Agent, or Firm*—Bierman & Bierman

[57] ABSTRACT

An ink composition for ink jet recording is disclosed which contains a water soluble dye, polyhydric alcohol, and potassium carbonate in an aqueous medium.

12 Claims, No Drawings

INK COMPOSITIONS FOR INK JET RECODING

This invention relates to an ink composition for ink jet recording and particularly to a water-based ink composition for ink jet recording wherein ink droplets are jetted through a nozzle by suddenly reducing a volume of a pressure chamber of print head.

The ink jet recording method of this kind is disclosed, for example, in U.S. Pat. No. 3,946,398. This method comprises the following two steps, that is to say, a step to reduce rapidly an inner volume of the pressure chamber filled with an ink composition by applying thereto electrical driving pulses and thereby to jet droplets of said composition through a nozzle, allowing one droplet per one driving pulse to reach to a recording paper, and a process of permitting the whole system, after jetting the droplets through the nozzle, to return to the initial state, allowing the system to stand ready for another subsequent ejection.

The ink used in the ink jet recording method of this type, as is also the case with an ink used in an ink jet recording method of other type, must have such characteristics as bringing, when used, no blocking at the nozzle, giving sufficient contrast to the resulting print, causing no change in physical properties or no precipitation thereof during storage and, at the same time, the ink is required to have adequate viscosity and surface tension and these properties must be maintained within appropriate values. The influence of the viscosity thereof is particularly large, and when an ink having a viscosity beyond the appropriate viscosity range for an apparatus used and values of electrical driving pulses given to the apparatus is used, the ink interferes said apparatus in its performance of jetting and returning-back steps with the result that no practically satisfactory jet recording operation can be carried out. For instance, when an ink having a viscosity lower than the appropriate viscosity value is used, difficulty resides in correcting the deviation of speed conferred on the ink column jetted from a nozzle in jetting step and consequently two or more ink droplets having different speed are often jetted by one electrical driving pulse, whereby quality of the resulting print records can markedly be deteriorated. The use of such ink can also prevent the apparatus from rightly performing its returning-back. That is, after completion of the jetting an ink droplet, meniscus of the ink temporarily falls down due to reaction of the jetting and, thereafter, at the time when the ink meniscus is brought back by capillary action to the initial state, a function of the ink as a damper becomes small if an viscosity of the ink is excessively low, with the result that the ink meniscus comes to oscillate passing over the end of the nozzle and thereafter being pulled back by surface tension of the ink, thereby requiring a long time before the ink meniscus settles down to the equilibrium position. On the contrary, when the ink viscosity is excessively high, no such oscillation occurs, but a long time is required for pulling back the ink meniscus by capillary action. Thus in either case, unnecessarily long time is required for the whole system to be brought back to its initial state and thus this results in reduction of print speed. In the ink jet method of this type, an appropriate viscosity region of ink is required to be from 4 to 20 centipoises. Similarly, appropriate surface tension of the ink required is from 40 to 60 dyn/cm.

Although various compositions have heretofore been proposed as ink compositions for use in ink jet recording methods, those known compositions in no way satisfy all the requirements, even though they successfully meet some of them, and thus they have defects in some way or other. For instance, in order for the viscosity of a ink compositions to be maintained at a desired level, it is known to incorporate into the ink composition such water-soluble thickners as cellulose derivatives (e.g. hydroxypropylcellulose, carboxymethylcellulose, hydroxyethylcellulose, methylcellulose) or polyvinyl alcohol. These water-soluble thickners, when used in the ink compositions for the ink jet recording of this type, however, have such practical difficulties that they often bring about change of the viscosity of the composition during storage due to interaction with a water-soluble dye which is a colorant or, in some cases, form a precipitate. Furthermore, when the ink composition incorporated with such water-soluble thickner is used with a nozzle having an orifice of about 30 to $200\mu$ in inner diameter, there are observed such difficulties that the nozzle is often blocked with solids deposited due to evaporation of a solvent from the ink composition retained in said nozzle, or because of intrusion of the air in an amount corresponding to the volume of the evaporated solvent into a print head through the end of nozzle to remain as a bubble in said head, the ink jetting operation responding to the inner volume change of the pressure chamber caused by a electric driving pulse is hindered, with the result that no ink is often jetted through the nozzle, or stable recording operation cannot be carried out because the jetting condition changes with the lapse of time. In order to prevent the nozzle from being blocked, there are known water-color ink compositions which have been incorporated with water-soluble polyhydric alcohols, for example, those as disclosed in U.S. Pat. Nos. 3,705,043 and 3,846,141, Japanese Patent Publications Laid-Open-to-Public Inspection Nos. 72712/1975 and 95008/1975, and West German Laid-Open Patent Publication No. 2,258,804. The water-color ink compositions all comprise as their fundamental ingredient an aqueous solution of a water-soluble dye and less than 40% by weight of a wetting agent, such as polyethylene glycol, polypropylene glycol, ethylene glycol, propylene glycol, diethylene glycol, glycerol or the like. By the addition of the wetting agent in such an amount as specified, however, the viscosity range of from 4 to 20 centipoises necessary for performing the ink jet recording method of this type cannot be maintained and, even in this case, prevention of the aforesaid nozzle blocking or intrusion of the air bubbles is incomplete. Further, ink compositions as disclosed in Japanese Patent Publication Laid-Open-to-Public Inspection No. 137506/1976 are known as ink compositions for use in a ink jet recording method. Even such ink compositions as referred to above, however, are still unable to have the long term storability and prevent changes in characteristics of the ink at the time of preparation thereof as will be mentioned later. As mentioned previously, in the ink jet recording method the indispensable requirements are such that the ink composition used is free from blocking at the nozzle or no change in physical properties of the ink composition is brought or no precipitate is formed in the composition at the time of storage thereof. Usually, however, when the ink is stored in a receptacle or retained in the nozzle, carbonic acid gas present in the air is absorbed by the ink and a pH of the ink changes, whereby there are observed such phenomena that the dye present in the ink aggregates or deposites and moreover viscosity of the ink abnormally increases. Such changes in physical properties due to the pH change are observed not only in basic and direct dyes but also in acid dyes. In order to prevent the influence of carbonic acid gas present in the air exerted on the physical properties of the ink, there are usually used monoethanolamine, diethanolamine, triethanolamine or the like amines. These amines, however, are strong in toxicity and exhibit considerable corrosion of ink receptacles made of rubber and synthetic resins and of materials for the ink supply system and, moreover, they must be used in a considerably large amount in order to control a pH value of the ink composition. Furthermore, such amines are known, after their absorption of carbonic acid gas, to release again the absorbed carbonic acid gas on heating to a relatively low temperature such as 50° C. or thereabouts. Thus, the ink composition comprising such amines is not suitable for use in the ink jet recording method using an ink receptacle made of rubber or synthetic resins.

An object of the present invention is to provide an ink composition for use in the ink jet recording method, from which the aforesaid drawbacks have all been eliminated without bringing about blocking at the pointed end of nozzle, without causing any changes in physical properties of the ink composition during storage thereof or without forming any precipitates in the ink composition, and which gives sufficient contrast to the resulting prints and moreover is capable of maintaining a stable and clear recording even when continued for a long period of time or even after suspension of the recording operation for a long period of time.

The present inventors have found that the object of the present invention can be accomplished by the use of an ink composition, which comprises 0.5 to 8% by weight of a water-soluble acid or direct dye, 45 to 70% by weight of a polyhydric alcohol having 2 to 6 carbon atoms and potassium carbonate.

Any water-soluble acid and direct dyes may be usable in the present invention without any difficulty so long as they have solubility of at least 5% by weight. In the case of performing the monochromatic recording by the use of the present ink composition, however, black or blue color dyes are preferably used in order to enhance a contrast on a recording sheet. For instance, there can be mentioned as the black color dyes C.I. Acid Black 2, 7, 24, 31, 52, 107, 118, 119 and 156, and C.I. Direct Black 17, 32, 38 and 51, and as the blue color dyes, C.I. Acid Blue 9, 62, 102, 104, 113, 117 and 120, and C.I. Direct Blue 1, 6, 15, 25, 71, 86 and 226. These dyes may be used either singly or in admixtures of two or more. The amount of such dye to be used is not particularly critical so long as it is within the range of capable of giving a sufficient contrast to the resulting print records and is an amount less than the limit of its solubility, but practically suitable is 0.5 to 8% by weight, preferably 1.0 to 5% by weight.

Any polyhydric alcohols may be usable as the polyhydric alcohols in the present invention, typical of which are ethylene glycol, propylene glycol, trimethylene glycol, glycerine, 1,3-butanediol, 2,3-butanediol, 1,4-butanediol, diethylene glycol, 1,5-pentanediol, hexylene glycol, triethylene glycol, dipropylene glycol and 1,2,6-hexanetriol. In the present invention, these polyhydric alcohols may be used either singly or in suitable admixtures of two or more.

All of the above-mentioned polyhydric alcohols are miscible with water in any proportions, and because of their hygroscopicity, low volatility and viscosity increasing property, they play an important role in the ink compositions of the present invention, said compositions having satisfied various requirements mentioned previously. The amount of these polyhydric alcohols used in decided after taking into consideration a desired viscosity of the ink composition, amount of water-soluble dye to be added, and contemplated degree of prevention or reduction of intrusion of air bubbles into the ink composition, and may vary according to the kind of polyhydric alcohol used. In order to satisfy all of the aforesaid requirements, however, the amount of the polyhydric alcohol to be added must be from 45 to 70% by weight. That is, if the amount of the polyhydric alcohol added is less than 45% by weight, the viscosity attained thereby is generally lower in many cases than that as desired, though this depends on the amount of dye added and on the kind of polyhydric alcohol used, and effects obtained on prevention of the nozzle blocking and air bubble intrusion are found to be insufficient. On the contrary, if the amount of the polyhydric alcohol added exceeds 70% by weight, the viscosity attained is often higher than that as desired. In either case, thereby caused are inoperability of print, decrease in print speed and abnormality of print.

Furthermore, potassium carbonate is used in the present invention principally as a pH regulator for the ink composition and added for the purpose of preventing change in physical properties of the ink composition due to carbonic acid gas and of improving atorability of the composition. Although many inorganic buffers have been considered and selected as those which are usable for this purpose, it has been found by the present inventors that potassium carbonate is the best buffer in view of solubility in water and polyhydric alcohols, optimum pH of the ink composition, storability of the composition and common ion effect brought about by dissolution of carbonic acid gas. The amount of potassium carbonate to be added may vary depending on its solubility in a mixture of water and polyhydric alcohols and on pH value of the ink composition as desired, but is suitably 0.1 to 5% by weight from a practical point of view and preferably 0.1 to 2% by weight.

As explained hereinbefore, the ink composition of the present invention consists essentially of an aqueous solution of a water-soluble acid or direct dye, a polyhydric alcohol and potassium carbonate, which composition may be incorporated with various additives if necessary. For instance, when the ink composition of the present invention is expected to be stored for a long period of time, the composition may be incorporated with preservatives or antimolds in order to inhibit or reduce the growth of bacteria or molds in the composition. Of various preservatives known to be useful for this purpose, a preferred one includes, for example, Bacillat 35 produced and sold by Hoechst AG. The amount of the preservative or antimold to be used is generally less than 1% by weight based on the total quantity of ink composition, particularly desirable range is from 0.01 to 0.5% by weight.

In addition, the present ink composition may be incorporated with a surface active agent in order to vary surface tension of the composition and improve "wetting" between the ink composition and ink flow path. Desirable surface active agents include such commercially available nonionic surface active agents as polyoxyalkylene and alkyl ethers thereof, siloxane-ocyalkylene copolymer (L-5340) sold by Union Carbide, fluorine type surface active agent (FC-430) sold by 3M Co. and the like surfactants. The amount of the surface active agent to be added is generally less than 1% by weight based on the total quantity of the ink composition, particularly from 0.05 to 0.5% by weight is preferable.

It has been known that calcium ions present in the ink composition react with carbonic acid gas in the surrounding air to form an insoluble calcium carbonate which causes blocking at the nozzle for ink jet recording or filter placed in the ink supply system. In this case, the calcium present in the ink composition is supplied by the dye, and said dye contains, besides the calcium, ions of such metals as iron, copper, magnesium, lead, etc. It is known to use a chelating reagent for the purpose of preventing the formation of precipitates resulting from the calcium or metal ions present in the ink composition. The chelating reagent reacts with the above-mentioned metal ions to form complex ions which are very stable and soluble. Useful chelating agents for this purpose include sodium gluconate, ethylenediaminetetraacetic acid (EDTA), disodium, trisodium, tetrasodium salts of EDTA, and sodium salt of diethylenetriaminepentaacetic acid. The amount of the chelating reagent to be used has to be an equal amount that reacts with the sum total of all of the metal ions contained in the ink composition, but usually the chelating reagent is added in several times the stoichiometric amount, taking the scattering into account. Although the amount of the chelating reagent to be added cannot be determined indiscriminatingly as it varies considerably depending on the kind and amount of the dye used, said amount may preferably be in the range of from 0.1 to 1% by weight based on the whole ink composition.

What is important in the preparation of the ink compositions of the present invention is to provide a homogeneous mixture and, on that account, it is desirable that all of the constituents of the ink composition is thoroughly stirred and mixed together to effect complete dissolution thereof and, at the same time, a filtering step is adopted in order to remove from the mixture any insoluble matters. When such filtering step is not adopted, there are some cases where the normal passing of the ink composition through nozzle is hindered by the presence of the insoluble matters or particulate matters, typical of which are dust or the like coming to intermix therewith from outside, whereby the ink is not jetted or subjected to abnormal jetting. In order to eliminate such undesirable phenomena, it is necessary to remove from the mixture any insoluble particulate matters of more than $5\mu$ in general, preferably more than $1\mu$ in particle size, though the particle size may vary depending on the diameter of nozzle. Suitable filtering materials used for this purpose include, for example, "Fluorinert FA" (a membrane filter made of Tefron produced and sold by Millipore Corporation).

Further, what is important in the preparation of the present ink composition is a care for not allowing large amount of air to dissolve in the ink composition. When large amount of air is present in the ink composition as prepared, air bubbles are often formed when the ink composition in the print head is subjected to temperature change, pressure change or vibration, and in this case the ink jetting cannot be effected in a normal manner and no stable recording operation can be carried out. In this connection, however, the stirring step is necessary for the actual preparation of the ink composition and, because of air dissolved previously in solvents used in the composition, the amount of air dissolved inherently in the ink composition is not negligible. It is desirable, therefore, to adopt some means or other in order to avoid the presence in the ink composition of the dissolved air, for instance, the ink composition as prepared is kept under reduced pressure to effect deaeration thereof. This deaeration step may be carried out either before or after the filtering step, but is preferably carried out after the filtering step, because air sometimes comes to be dissolved in the ink composition during the filtering step.

The present invention is further illustrated with reference to examples.

EXAMPLE 1

| Constituent | % by weight |
| --- | --- |
| Ethylene glycol | 43.7 |
| Diethylene glycol | 10.0 |
| Dye: C.I. Direct Black 32 | 2.5 |
| Distilled water | 33.5 |
| Potassium carbonate | 0.2 |
| Bacillat 35 (A preservative of Hoechst AG.) | 0.1 |

The above-mentioned constituents were thoroughly stirred and mixed together to form a homogeneous mixture, and the resultant mixture was filtered with a filter of $1.0\mu$ in pore size to obtain an ink composition having a viscosity of 7.0 cps at ordinary temperature (25° C.) and surface tension of 59 dyn/cm.

The ink composition thus prepared was filled in an apparatus disclosed in FIGS. 1-3 of U.S. Pat. No. 3,946,398 having the under-mentioned parameters to effect an ink jet recording operation, whereupon clear and favorable print records were obtained and the quality of the records did not change with the lapse of time even when the operation was continued for 24 hours. Furthermore, after the one-month lapse from completion of the recording operation, the operation was initiated again, whereupon no abnormal phenomena such as nozzle-brokage and the like were observed and the print records obtained were found to have the same high quality as that of those obtained before suspension of the operation. No formation of precipitates or discoloration was observed in the ink composition even after a long term storage thereof.

| Parameters: | |
| --- | --- |
| Printing speed | 2000 point/sec. |
| Stationary pressure | 0.006 psi |
| Peak pressure of nozzle | 4.95 psi |
| Voltage of pulse | 65 V |
| Width of pulse | 135 $\mu s$ |
| Diameter of orifice | 0.0028 inch |

EXAMPLE 2

| Constituents | % by weight |
| --- | --- |
| Ethylene glycol | 64.0 |
| Dye: C.I. Direct Black 38 | 4.0 |
| Distilled water | 31.2 |
| Potassium carbonate | 0.5 |
| EDTA (tetra sodium) | 0.2 |

| Constituents | % by weight |
| --- | --- |
| Bacillat 35 (Hoechst AG.) | 0.1 |

An ink composition was prepared by using the above-mentioned constituents in the same manner as in Example 1, of which the viscosity was 7.0 cps at ordinary temperature (25° C.) and surface tension was 49 dyn/cm.

Using the thus prepared ink composition was subjected to ink jet recording operation using the same apparatus as in Example 1, whereupon favorable print records were obtained in the same was as in Example 1. Furthermore, no difficulties were observed in the ink composition when stored for a prolonged period of time.

EXAMPLE 3

| Constituents | % by weight |
| --- | --- |
| Diethylene glycol | 45.0 |
| Dye: C.I. Acid Black 109 | 3.5 |
| Distilled water | 51.0 |
| Potassium carbonate | 0.4 |
| Bacillat 35 (Hoechst AG.) | 0.1 |

The above-mentioned constituents were treated in the same manner as in Example 1 to prepare an ink composition having a viscosity of 5.4 cps at ordinary temperature (25° C.) and surface tension of 41 dyn/cm.

Using the same apparatus as in Example 1, the thus prepared ink composition was subjected to ink jet recording operation to obtain favorable print records in the same way as in Example 1. Furthermore, no difficulties were observed in the ink composition even when stored at room temperature for an extended period of time.

EXAMPLE 4

| Constituents | % by weight |
| --- | --- |
| Triethylene glycol | 45.0 |
| Dye: C.I. Direct Black 32 | 3.0 |
| Distilled water | 51.4 |
| Potassium carbonate | 0.5 |
| Bacillat 35 (Hoechst AG.) | 0.1 |

The above-mentioned constituents were treated in the same manner as in Example 1 to prepare an ink composition, of which the viscosity was 6.5 cps at ordinary temperature (25° C.) and surface tension was 55 dyn/cm.

The thus prepared ink composition was subjected to ink jet recording operation with the same apparatus as in Example 1 to obtain favorable print records in the same way as in Example 1. Furthermore, no difficulties were observed in the ink composition even after a long term storage thereof.

EXAMPLE 5

| Constituents | % by weight |
| --- | --- |
| Ethylene glycol | 62.0 |
| Dye: C.I. Direct Blue 200 | 2.0 |
| Dye: C.I. Direct Blue 108 | 2.0 |
| Distilled water | 33.4 |
| Potassium carbonate | 0.5 |
| Bacillat 35 (Hoechst AG.) | 0.1 |

The above-mentioned constituents were treated in the same manner as in Example 1 to prepare an ink composition, of which the viscosity was 6.3 cps at ordinary temperature (25° C.) and surface tension was 56 dyn/cm.

The thus prepared ink composition was subjected to ink jet recording operation using the same apparatus as in Example 1 to obtain favorable print records in the same way in Example 1. Furthermore, no difficulties were observed in the ink composition even after a long term storage thereof.

We claim:

1. An ink composition for ink jet recording which consists essentially of an aqueous medium, 0.5 to 8% by weight of a water-soluble acid or direct dye, 45 to 70% by weight of a polyhydric alcohol having 2 to 6 carbon atoms, and an amount of potassium carbonate effective to improve the storability of said composition.

2. An ink composition for ink jet recording according to claim 1, wherein the composition comprises 1.0–5% by weight of a water-soluble acid or direct dye.

3. An ink composition for ink jet recording according to claim 1, wherein the polyhydric alcohols is selected from the group consisting of ethylene glycol, propylene glycol, trimethylene glycol, glycerine, 1,3-butanediol, 2,3-butanediol, 1,4-butanediol, diethylene glycol, 1,5-pentanediol, hexylene glycol, triethylene glycol, dipropylene glycol and 1,2,6-hexanetriol.

4. An ink composition for ink jet recording according to claim 1, wherein the composition contains 0.1–2% by weight of potassium carbonate.

5. An ink composition for ink jet recording according to claim 1, wherein the composition further contains a preservative.

6. An ink composition for ink jet recording according to claim 5, wherein the composition contains 0.01–0.5% by weight of the preservative.

7. An ink composition for ink jet recording according to claim 1, wherein the composition further contains a surface active agent.

8. An ink composition for ink jet recording according to claim 7, wherein the composition contains 0.05–0.5% by weight of the surface active agent.

9. An ink composition for ink jet recording according to claim 1, wherein the composition further contains a chelating agent.

10. An ink composition for ink jet recording according to claim 9, wherein the chelating agent is selected from the group consisting of sodium gluconate, ethylenediaminetetraacetic acid, disodium ethylenediaminetetraacetate, trisodium ethylenediaminetetraacetate, tetrasodium ethylenediaminetetraacetate or sodium diethylenetriaminepentaacetate.

11. An ink composition for ink jet recording according to claim 9, wherein the composition contains 0.1–1% by weight of the chelating agent.

12. A composition according to claim 1 containing 0.1 to 5.0% of said potassium carbonate by weight based on said composition.

* * * * *